(12) United States Patent
Yang et al.

(10) Patent No.: US 9,991,521 B2
(45) Date of Patent: Jun. 5, 2018

(54) METHOD FOR DISPERSING PARTICLES IN PERFLUORINATED POLYMER IONOMER

(75) Inventors: Zhiwei Yang, South Windsor, CT (US); Mallika Gummalla, Longmeadow, MA (US)

(73) Assignee: Audi AG, Ingolstadt (DE)

( * ) Notice: Subject to any disclaimer, the term of this patent is extended or adjusted under 35 U.S.C. 154(b) by 168 days.

(21) Appl. No.: 14/396,001

(22) PCT Filed: Apr. 23, 2012

(86) PCT No.: PCT/US2012/034664
§ 371 (c)(1),
(2), (4) Date: Oct. 21, 2014

(87) PCT Pub. No.: WO2013/162499
PCT Pub. Date: Oct. 31, 2013

(65) Prior Publication Data
US 2015/0051065 A1   Feb. 19, 2015

(51) Int. Cl.
| | |
|---|---|
| *H01M 4/90* | (2006.01) |
| *H01M 8/1039* | (2016.01) |
| *H01M 8/1051* | (2016.01) |
| *C08K 3/08* | (2006.01) |
| *C08J 3/24* | (2006.01) |
| *C08K 9/02* | (2006.01) |
| *H01M 4/88* | (2006.01) |

(52) U.S. Cl.
CPC ............ *H01M 4/9075* (2013.01); *C08J 3/24* (2013.01); *C08K 3/08* (2013.01); *C08K 9/02* (2013.01); *H01M 4/8828* (2013.01); *H01M 8/1039* (2013.01); *H01M 8/1051* (2013.01); *C08J 2327/18* (2013.01)

(58) Field of Classification Search
CPC .................................................. H01M 4/8828
See application file for complete search history.

(56) References Cited

U.S. PATENT DOCUMENTS

| | | | | |
|---|---|---|---|---|
| 5,498,372 A | * | 3/1996 | Hedges | .................... C08K 9/08 106/472 |
| 2005/0238938 A1 | | 10/2005 | Rajendran | |
| 2006/0105226 A1 | | 5/2006 | Kim et al. | |
| 2008/0292931 A1 | * | 11/2008 | Schwartz | ............ H01M 4/8605 429/524 |
| 2008/0292935 A1 | | 11/2008 | Roelofs | |
| 2009/0202883 A1 | | 8/2009 | Ghielmi et al. | |
| 2009/0269644 A1 | | 10/2009 | Hamrock et al. | |
| 2010/0193143 A1 | | 8/2010 | Amma et al. | |

FOREIGN PATENT DOCUMENTS

| | | | |
|---|---|---|---|
| CN | 1776947 A | | 5/2006 |
| CN | 101501918 A | | 8/2009 |
| JP | 2000188013 A | * | 7/2000 |
| JP | 2002-8680 A | | 1/2002 |
| JP | 2005-539352 A | | 12/2005 |
| JP | 2006-142293 A | | 6/2006 |
| JP | 2006-286329 A | | 10/2006 |
| JP | 2009-521579 A | | 6/2009 |
| JP | 2009-521795 A | | 6/2009 |
| JP | 2009-541963 A | | 11/2009 |
| WO | 2004/025800 A2 | | 3/2004 |
| WO | 2007/073500 A2 | | 6/2007 |
| WO | 2008/000709 A1 | | 1/2008 |
| WO | 2008/085149 A2 | | 7/2008 |
| WO | 2012/026916 A1 | | 3/2012 |

OTHER PUBLICATIONS

Ghassemi et al., ACS Symposium Series, ACS Symposium Series (2012), 1096 (Polymers for Energy Storage and Delivery: Polyelectrolytes for Batteries and Fuel Cells), 201-220, publication date(Web): May 7, 2012.*
PCT International Search Report dated Dec. 14, 2012 for PCT Application No. PCT/US2012/034664.

* cited by examiner

*Primary Examiner* — Yun Qian
(74) *Attorney, Agent, or Firm* — Seed IP Law Group LLP

(57) ABSTRACT

A method for preparing dispersing particles in perfluorinated polymer ionomer includes combining particles and a perfluorinated ionomer precursor in a mixture, and converting the perfluorinated ionomer precursor to a perfluorinated proton-conducting ionomer in the presence of the particles.

16 Claims, 1 Drawing Sheet

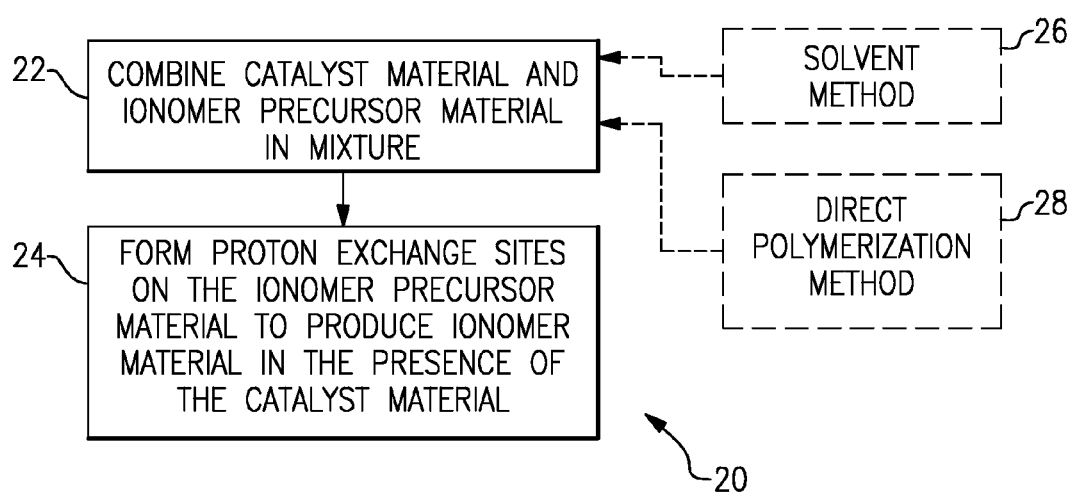

METHOD FOR DISPERSING PARTICLES IN PERFLUORINATED POLYMER IONOMER

BACKGROUND

This disclosure relates to a method for producing a uniform dispersion of particles in a perfluorinated ionomer polymer, for use in electrochemical devices, such as fuel cells.

Fuel cells are electrochemical devices that convert chemical energy in a fuel source to electricity and heat. A fuel cell includes a membrane electrode assembly (MEA), which has an electrolyte membrane sandwiched between two electrodes, an anode catalyst electrode and a cathode catalyst electrode.

A Proton Exchange Membrane Fuel Cell (PEMFC) is one type of fuel cell that is under consideration for high efficiency electricity generation in transportation and stationary applications. A typical MEA in a PEMFC includes a proton-conducting polymer electrolyte membrane and two electrodes, including anode and cathode electrodes. The electrodes typically include nano-particle catalysts, such as platinum or platinum alloys, supported on porous carbon, and perfluorinated proton-conducting polymer ionomer. The electrodes provide a three-phase contact that is necessary for electrochemical reaction, while enabling effective transport of gases (reactant and product), electrons and protons.

Traditional electrode fabrication methods typically include blending perfluorinated polymer ionomer dispersion solution and catalyst nano-particles to form a catalyst ink, and applying the catalyst ink on electrolyte membranes. The techniques for applying catalyst ink on membranes may include screen-printing, solution-spraying or decal-transfer, for example.

The catalyst ink preparation, including selection of the polymer ionomer and blending of the ionomer with the catalyst nano-particle materials, greatly influences the performance of the MEA in a PEMFC. Currently, aqueous perfluorinated sulfonic acid (PFSA) polymer dispersion (i.e. NAFION® dispersion), which has an equivalent weight (EW) between 850 g/mol to 1500 g/mol, has been exclusively used as ionomer material for catalyst ink preparation for PEMFC electrode applications. The EW represents the mass (in grams) of the material that contains one mole of active functional groups, such as —$SO_3H$ acid groups in PFSA polymers which function as proton exchange sites in the polymer Polymer ionomer and catalyst materials are preferably very well mixed. However, as is known in the art, traditional methods for catalyst ink preparation, including but not limited to mechanically dispersing using ultrasonic, high shear mixing and/or ball milling, cannot fully break down the catalyst nano-particle agglomerates in catalyst ink solutions, and therefore, may not produce uniform dispersion of catalyst nano-particles in PFSA ionomer solution/ink used to make the electrodes.

In addition, the EW of PFSA polymer ionomer strongly influences the proton transport ability in the electrodes. The typical EW range of currently commercially available PFSA ionomer dispersion is between 850 g/mol to 1100 g/mol, which cannot provide sufficient proton conductivity in electrodes for high temperature and low humidity PEMFC operating conditions. Linear PFSA ionomer with an EW of less than about 700 g/mol provides superior proton conductivity but is water soluble, and therefore, cannot be effectively applied in electrodes through traditional electrode fabrication methods.

SUMMARY

A disclosed method for preparing dispersing particles in perfluorinated polymer ionomer includes combining particles and a perfluorinated ionomer precursor in a mixture, and converting the perfluorinated ionomer precursor to a perfluorinated proton-conducting ionomer in the presence of the particles.

In another aspect, a method for dispersing particles in perfluorinated polymer ionomer includes combining noble metal catalyst particles and a perfluorinated ionomer precursor in a mixture to coat the noble metal catalyst particles with the perfluorinated ionomer precursor, applying the noble metal catalyst particles that are coated with the perfluorinated ionomer precursor onto a polymeric substrate and converting the perfluorinated ionomer precursor to a perfluorinated proton-conducting ionomer.

DESCRIPTION OF THE FIGURES

FIG. 1 shows an example method for preparing uniform dispersion of catalyst particle materials in perfluorinated polymer ionomer solution.

DETAILED DESCRIPTION OF THE PREFERRED EMBODIMENT

FIG. 1 illustrates selected portions of an example method 20 for dispersing particle materials in perfluorinated polymer ionomer solution. The particle materials include nano-particles, as well as micro-sized particles. In further examples, the catalyst particle materials are noble metal or noble metal alloy catalyst nano-particles, with or without support, such as porous carbon, metal oxide, etc. The catalyst particle material is also referred to as catalyst material or particles in this disclosure. The catalyst particle materials are well dispersed in a perfluorinated ionomer mixture with aqueous or non-aqueous solvents to form catalyst ink. The ink is applied on electrolyte membranes to form a membrane electrode assembly. It is to be understood that the method 20 and nano-particle materials dispersed in perfluorinated ionomer mixture are not limited to such a use and that other devices will also benefit from this disclosure. The term "nano-particle" in this disclosure refers to the particles that are 1-500 nanometers in average diameter. In a further example, the particles are 1-100 nanometers in average diameter or 1-50 nanometers in average diameter.

In proton exchange membrane fuel cells and other electrochemical devices, the selection of the polymer ionomer and the techniques used to fabricate electrodes control the performance of the devices with regard to voltage-current characteristics, fuel cell durability, efficiency, etc. As an example, the uniformity of the polymer ionomer coating and its thickness in the catalyst electrode layers directly influences gas, proton and electron transport in the electrodes, and thus the operational efficiency of the device. The selection of the polymer ionomer and the equivalent weight of the ionomer directly influence the performance and durability of the electrode, especially under the relatively high temperatures and low relative humidity operating conditions.

One factor impacting durability is the chemical structure of the polymer ionomer. Among different proton-conducting polymers, perfluorinated polymer ionomer is exclusively used in fuel cells because of the harsh/corrosive operating environment of the electrochemical cells.

One factor impacting performance is the equivalent weight of the polymer ionomer. A traditional perfluorinated polymer ionomer, perfluorinated sulfonic acid (PFSA), includes sulfonic acid groups, —$SO_3H$, as proton-conducting sites that terminate pendent perfluorinated side chains of the polymer. PFSA polymers with lower equivalent weight often provide better proton conductivity, and thus better proton transport in the electrodes. The equivalent weight of PFSA polymer widely used in fuel cell electrodes is typically between 850 g/mol and 1100 g/mol. Conventional PFSA polymer ionomer with lower equivalent weight, as low as about 700 g/mol, may still be applicable in fuel cell electrodes. However, PFSA polymer ionomer with even lower EW (less than about 700 g/mol) is water soluble, and therefore, not directly applicable as ionomer in fuel cell electrodes.

Perfluorinated sulfonimide (PFSI) polymers have perfluorinated carbon-carbon linear backbone chains and perfluorinated side chains extending off of the perfluorinated carbon-carbon linear backbone chains. PFSI includes at least one sulfonimide group, —$SO_2$—NH—$SO_2$—, that is a part of a side chain structure and functions as a proton exchange site by providing a proton from its nitrogen atom. The perfluorinated side chains could include pendent chains that are terminated with —$CF_3$ or sulfonic acid groups and cross-link chains that are covalently linked to another perfluorinated carbon-carbon backbone chain to form the cross-linked polymer. The cross-linked perfluorinated sulfonimide polymers with extremely low equivalent weight (280-700) are highly proton-conducting and insoluble in water, and therefore, are suitable to be used as ionomer materials in fuel cell electrodes.

As will be described, the example method 20 provides a technique for preparing perfluorinated ionomer of desirable equivalent weight, ranging from about 280 g/mol to about 1500 g/mol, and of uniform dispersion of the perfluorinated ionomer throughout catalyst materials for enhanced performance, durability and efficiency of fuel cell electrodes.

Referring to FIG. 1, the method 20 generally includes a combining step 22 and a converting step 24. It is to be understood, however, that additional steps can be used with the combining step 22 and the converting step 24. In one embodiment, the combining step 22 includes combining particles, such as catalyst particles or catalyst particle material, and a perfluorinated ionomer precursor, such as a solution, in a mixture, and the converting step 24 includes converting the perfluorinated ionomer precursor to perfluorinated proton conducting ionomer in the presence of the particles. The method 20 is thereby flexible to allow the preparation of catalyst materials dispersed in perfluorinated ionomer precursor solution with desirable target ionomer equivalent weight and weight percentage. Further, the forming of the perfluorinated proton conducting ionomer in the presence of catalyst materials provides a uniform dispersion off catalyst particles with a uniform coating of the ionomer on the catalyst particles. That is, ionomer and catalyst particle agglomeration are reduced. It is to be understood that the method 20 may also be used with other type of particles in addition to or as an alternative to the catalyst particles.

In a further example, the resulting catalyst materials dispersed in perfluorinated ionomer precursor solution of the method 20 has a composition of 50%-95%, or 59%-77%, by weight, of dry catalyst material and a balance of the perfluorinated ionomer, and the ionomer has an equivalent weight of less than 700 g/mol or is between 280 g/mol and 700 g/mol.

In other examples, the equivalent weight is greater than 700 g/mol or is between 700 g/mol and 1100 g/mol. In further embodiments, the catalyst materials include nanoparticles, as well as micro-sized particles, of at least one noble metal, with or without carbon support. The noble metal or metals include, for example, platinum, gold, cobalt, iron, nickel, iridium, chromium, molybdenum, palladium, ruthenium, scandium, rhodium, vanadium or combinations thereof. In further examples, the noble metal or metals includes at least one of platinum and palladium. In further examples, the noble metal or metals are 1-100 nanometers in average diameter, 1-30 nanometers in average diameter or 1-15 nanometers in average diameter. In further examples, the noble metal or metals are supported by porous carbon particles. For example, the carbon particles are ketjen black, acetylene black, black pearls, graphitized carbon, or functionalized carbon with hydrophilic or hydrophobic moieties.

In further examples, the ionomer precursor is a PFSA polymer resin (in —$SO_2F$ form), perfluorinated sulfonamide (—$SO_2NH_2$) polymer or monomers of a target ionomer. In one example, the final polymer ionomer is linear or cross-linked PFSA, linear or cross-linked PFSI, or combinations thereof. In another example, the final polymer may have more than one proton exchange site per side chain and is either linear or cross-linked. The cross-link chain may also have more than one proton exchange site.

In further embodiments, the combining step 22 is carried out using either of two different techniques, including a solution blending method 26 or an in-situ polymerization method 28. In one example of the solution blending method 26, the combining step 22 includes combining the particles and the perfluorinated ionomer precursor in a mixture within a solvent or mixture of solvents. As an example, the solvent or mixture of solvents are effective to readily dissolve the selected perfluorinated ionomer precursor to form a solution. The solvents include, but are not limited to, tetradecafluorohexane, perfluorodecalin, perfluorinated cyclohexane, 1,1,1,2,2,3,4,5,5,5-decafluoro pentane and trichlorotrifluoroethane. As another example, the solvent or mixture solvents are non-fluorinated polar solvent(s) that are effective to readily dissolve the selected perfluorinated ionomer precursor to form a real solution. The polar solvents include, but not limited to, acetonitrile, 1,4-dioxane, n-methyl-2-pyrrolidone (NMP), dimethyl sulfoxide (DMSO) and n,n-dimethylformamide (DMF).

In a further example, the perfluorinated ionomer precursor is dissolved in the solvent and particles are then added in a mixture to the solution of the solvent and the dissolved ionomer precursor. In one example, the mixture is non-aqueous. As an alternative, the particles are added to the solvent prior to, or in combination with, dissolving the perfluorinated ionomer precursor in the solvent.

In one embodiment, after the combining step 22 that produces the mixture of the ionomer precursor and the particles, the solvent is then removed such that a nano-thickness perfluorinated ionomer precursor uniformly coats the particles. The term "nano-thickness" in this disclosure refers to an average thickness of 100 nanometers or less. In a further example, the average nano-thickness is 5 nanometers or less.

As an example, the solvent is removed by spray drying, oven drying, vacuum distillation/drying, or rotoevaporation, although other techniques can also be used. The removal of the solvent causes the perfluorinated ionomer precursor to substantially surround the particles.

In a further example, after removal of the solvent, the resulting "dry" (solvent free) perfluorinated ionomer precursor coated particles are treated, using appropriate solvents and reagents in the converting step 24, to convert the perfluorinated ionomer precursor to perfluorinated proton conducting polymer ionomer. Thus, the proton exchange sites are formed in the presence of the particles, giving uniform layer of perfluorinated ionomer throughout particles.

In further embodiment, the well dispersed particles and ionomer is prepared as an electrode "ink" using known techniques including, but not limited to, ultrasonic dispersing, high shear mixing and/or ball milling, and applied to a substrate through direct coating or decal transfer. In a further example, a binder is added to the perfluorinated ionomer coated particles during the ink preparation. In one example, the binder is a PFSA dispersion solution (such as NAFION dispersion). In one embodiment, the substrate is a proton exchange membrane, such as a PFSA membrane.

Alternatively, the resulting "dry" (solvent free) perfluorinated ionomer precursor coated particles are directly applied to a substrate, such as a polymer exchange membrane. The polymer exchange membrane and ionomer precursor coated particles are then treated, using appropriate solvents and reagents in the converting step 24, to convert the ionomer precursor on the catalyst material to a perfluorinated proton-conducting ionomer in the presence of the particles and the substrate. These materials may be optionally heat treated to increase the binding within the ionomer.

In further embodiments, in which non-perfluorinated polar solvent(s) is used, after the combining step 22 that produces the mixture solution of the perfluorinated ionomer precursor and the particles, without removing the solvents, the reagents are directly added into the mixture solution to convert the perfluorinated ionomer precursor to a perfluorinated proton-conducting ionomer in the converting step 24, giving uniform perfluorinated ionomer dispersed particles for electrode application.

In one embodiment that utilizes the in-situ polymerization method 28 of the combining step 22, one or more monomers of the target perfluorinated ionomer precursor are mixed with the particles in the combining step 22. The perfluorinated ionomer precursor thereby is formed in the presence of the particles through free-radical polymerization. The perfluorinated ionomer precursor that is coated on the particles is then converted in the converting step 24 to a perfluorinated proton conducting ionomer, either before or after application to a substrate, as described above.

The following examples further illustrate embodiments of the solvent method 26 and the in-situ polymerization method 28 of the combining step 22, and the subsequent converting step 24.

EXAMPLE 1: Intermediate to High EW Ionomer Based Inks

In one example, the ionomer precursor is a PFSA resin (in —$SO_2F$ form) having an equivalent weight of equal to or greater than about 700 g/mol. The PFSA resin (in —$SO_2F$ form) is dissolved in partially-fluorinated or perfluorinated solvent(s) to form a solution. The solvents include, but are not limited to, tetradecafluorohexane, perfluorodecalin, perfluorinated cyclohexane, and 1,1,1,2,2,3,4,5,5,5-decafluoro pentane (HFC 43-10). Increasing the solution temperature is generally helpful to improve the solubility of the polymer in the solvent(s) in this step. The catalyst nano-particles are then added to the solution in a desired amount to produce the target composition. The solvent(s) is (are) then removed such that the PFSA resin (in —$SO_2F$ form) uniformly coats the catalyst material. The PFSA resin (in —$SO_2F$ form) on the catalyst material is then hydrolyzed in a base solution, such as KOH or NaOH solution, and then rinsed or washed with an acid to convert —$SO_2F$ groups into —$SO_3H$ groups, giving uniform PFSA ionomer (—$SO_3H$ form) dispersed catalyst nano-particle material. The hydrolysis and acidification conditions are those generally known in the art. For example, the PFSA resin (in —$SO_2F$ form) coated catalyst nano-particles are stirred in KOH:water:DMSO (15:25:60 wt %) solution at 60° C. for 6 hours, followed by rinsing with D.I water 2-3 times, stifling in 2M $HNO_3$ at 60° C. for 3 hours for acidification, and then rinsing repeatedly with deionized water until washing water becomes neutral.

EXAMPLE 2: For Low EW Cross-Linked Ionomer Inks

In another example, the ionomer precursor is a PFSA resin (in —$SO_2F$ form) having an equivalent weight of lower than 700 g/mol. The low equivalent weight PFSA resin (in —$SO_2F$ form) is dissolved in partially-fluorinated or perfluorinated solvent(s) to form a solution as described in the Example 1. The catalyst nano-particle material is then added to the solution in a desired amount to produce the target composition. The solvent(s) is (are) then removed by rotoevaporation such that the low equivalent weight PFSA resin (in —$SO_2F$ form) uniformly coats the catalyst material.

The low EW PFSA resin (in —$SO_2F$ form) on catalyst material is then treated with a cross-linking agent in a base solution to convert —$SO_2F$ into —$SO_2NHSO_2$—, and therefore, resulting in a cross-linked, water-insoluble PFSI ionomer coated on the catalyst material. The cross-linking agent is a perfluorinated di-sulfonamide compound that has a general formula $H_2NSO_2$—Rf—$SO_2NH_2$, wherein, Rf is branched or unbranched perfluoroalkyl or perfluoropolyether group comprising 1-10 carbon atoms and 0-4 oxygen atoms. The base solution includes at least one tertiary amine base and at least one polar solvent. The tertiary amine bases include, but are not limited to, trimethylamine, triethylamine, tributylamine, and 1,4-diazabicyclo[2.2.2]octane (DABCO). The polar solvents include, but not limited to, acetonitrile, 1,4-dioxane, N-Methyl-2-pyrrolidone (NMP), Dimethyl sulfoxide (DMSO), N,N-Dimethylformamide (DMF) or combinations thereof.

EXAMPLE 3

In another example, the polymer precursor is PFSA resin (—$SO_2F$ form) with an equivalent weight between about 280 g/mol and about 1500 g/mol, and preferably between about 280 g/mol and about 700 g/mol. The PFSA resin (—$SO_2F$ form) is treated by using gas $NH_3$ to convert to perfluorinated sulfonamide (—$SO_2$—$NH_2$ form) polymer. The perfluorinated sulfonamide polymer is dissolved in a polar solvent, including but not limited to acetonitrile, 1,4-dioxane, n-methyl-2-pyrrolidone (NMP), dimethyl sulfoxide (DMSO) or n,n-dimethylformamide (DMF) to form a solution. Increasing the solution temperature is generally helpful to improve the solubility of the polymer in the solvent(s) in this step. The catalyst nano-particle material is then added to the solution in a desired amount to produce the target composition.

In one example, the solvent is then removed, a different polar solvent, cross-linking agent and tertiary amine base(s) are added in to convert —$SO_2NH_2$ into —$SO_2NHSO_2$— in the presence of catalyst material, and therefore, producing uniform, nano-thickness cross-linked PFSI ionomer on the catalyst material. The cross-linking agent is a perfluorinated di-sulfonyl fluoride compound that has a general formula $FSO_2$—Rf1-$SO_2F$, wherein, Rf1 is branched or unbranched perfluoroalkyl, or perfluoropolyether group comprising 1-10 carbon atoms and 0-4 oxygen atoms. The solvent(s) and tertiary amine base(s) are as described in Example 2. Alternatively, without removing the solvent(s), the perfluorinated di-sulfonyl fluoride cross-linking agent and tertiary amine base(s) are directly added to the solution mixture to convert —$SO_2NH_2$ into —$SO_2NHSO_2$—, producing uniform, nano-thickness cross-linked PFSI ionomer on the catalyst material.

In further examples, the perfluorinated ionomer precursor, PFSA resin in —$SO_2F$ form, is uniformly coated on a catalyst nano-particle material first, as described in the Example 1, then treated with gas $NH_3$ to convert —$SO_2F$ to —$SO_2$—$NH_2$ in the presence of the catalyst material, giving perfluorinated sulfonamide polymer coated catalyst material, which is then treated with a cross-linking agent in a base solution to produce uniform, nano-thickness cross-linked PFSI ionomer on the catalyst material as described above.

In further examples, the perfluorinated ionomer precursor is a homopolymer of perfluoroalkyl vinyl ether monomers that have a general formula of $CF_2$=C(F)—Rf2-$SO_2F$, wherein, Rf2 is branched or unbranched perfluoroalkyl, perfluoroalkoxy, or perfluoropolyether group comprising 1-10 carbon atoms and 0-4 oxygen atoms.

EXAMPLE 4

In an embodiment that utilizes the in-situ polymerization, a perfluoroalkyl vinyl ether monomer (as described above) is combined in the combining step 22 with catalyst nano-particle materials, tetrafluoroethylene and free radical initiator(s), such that the polymerization is carried out in the presence of catalyst nano-particles. In embodiments, the polymerization is solution polymerization or emulsion polymerization. In the solution polymerization, the monomers are dissolved in perfluorinated or partially fluorinated solvent(s) and then the catalyst nano-particles are added. In the emulsion polymerization, due to the hydrophobic property of the catalyst nano-particle surface, the catalyst nano-particles are dispersed together with monomer(s) to form micelles in an aqueous solution. The free radical polymerization is carried out in both cases to directly generate nano-thickness ionomer precursor (in —$SO_2F$) coated on the catalyst nano-particle surface.

In the examples that the formed ionomer precursor has an equivalent weight of greater than 700 g/mol or is between 700 g/mol and 1500 g/mol, the ionomer precursor coated catalyst material is treated as described in Example 1, to form uniform, nano-thickness proton conducting ionomer coated catalyst material.

In other examples, the formed ionomer precursor has an equivalent weight of less than 700 g/mol or is between 280 g/mol and 700 g/mol, the ionomer precursor coated catalyst material is treated as described in Example 2, to form nano-thickness, cross-linked proton conducting ionomer coated catalyst material. Alternatively, the ionomer precursor coated catalyst material is treated with $NH_3$ gas to convert the —$SO_2F$ groups to —$SO_2NH_2$, then further treated, as described in Example 3, to convert the —$SO_2NH_2$ groups to sulfonimide groups, —$SO_2$—NH—$SO_2$, to produce a uniform, nano-thickness, cross-linked low EW perfluorinated sulfonimide polymer coated catalyst nano-particle material.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for dispersing particles in perfluorinated polymer ionomer, the method comprising:
   combining the particles and a perfluorinated ionomer precursor having an equivalent weight less than 700 g/mol in a mixture;
   dispersing the particles and coating the particles with a uniform, nano-thick coat of the perfluorinated ionomer precursor; and
   treating the perfluorinated ionomer precursor with a cross-linking agent in a basic solution comprising at least one tertiary amine base, thereby converting the perfluorinated ionomer precursor to a cross-linked perfluorinated proton-conducting ionomer in the presence of the particles, the cross-linked perfluorinated proton-conducting ionomer having an equivalent weight ranging from 280 q/mol to 700 g/mol and being insoluble in water;
   wherein the perfluorinated ionomer precursor comprises perfluorinated carbon-carbon linear backbone chains and perfluorinated pendent side chains extending off of the perfluorinated carbon-carbon linear backbone chains, and the perfluorinated pendent side chains terminate with a —$SO_2X$ group, where each X is independently selected from the group consisting of fluorine (F), chlorine (Cl) and amine ($NH_2$),
   wherein the cross-linking agent has the formula $H_2NSO_2$—Rf—$SO_2NH_2$, wherein, Rf is branched or unbranched perfluoroalkyl or perfluoropolyether group comprising 1-10 carbon atoms and 0-4 oxygen atoms.

2. The method as recited in claim 1, wherein the perfluorinated ionomer precursor has a dry weight of 5%-100%, by weight, of the particles.

3. The method as recited in claim 1, wherein the perfluorinated ionomer precursor has a dry weight of 30%-70%, by weight, of the particles.

4. The method as recited in claim 1, wherein the perfluorinated proton-conducting ionomer surrounds the particles.

5. The method as recited in claim 1, wherein the combining of the particles and the perfluorinated ionomer precursor includes dissolving the perfluorinated ionomer precursor in at least one solvent.

6. The method as recited in claim 5, wherein the coating further comprises removing at least one solvent.

7. The method as recited in claim 6, including applying the particles that are coated with the cross-linked perfluorinated proton-conducting ionomer onto a substrate.

8. The method as recited in claim 7, wherein the cross-linking includes forming at least one sulfonimide group, —$SO_2$—NH—$SO_2$—, to covalently link two perfluorinated pendent side chains of the perfluorinated ionomer precursor that is coated on the particles.

9. The method as recited in claim 6, including applying the particles that are coated with the perfluorinated ionomer precursor onto a substrate and then treating the perfluorinated ionomer precursor to form the cross-linked perfluorinated proton-conducting ionomer.

10. The method as recited in claim 1, wherein the combining of the particles and the perfluorinated ionomer precursor includes providing at least one monomer of the perfluorinated ionomer precursor and mixing the at least one monomer with the particles.

11. The method as recited in claim 10, including polymerizing the at least one monomer to produce the perfluorinated ionomer precursor in the presence of the particles.

12. The method as recited in claim 11, including treating the perfluorinated ionomer precursor on the particles to form the cross-linked perfluorinated proton-conducting ionomer.

13. The method as recited in claim 1, wherein the particles include nano-particles, and the nano-particles include at least one noble metal.

14. The method as recited in claim 13, wherein the nano-particles are further disposed on a support selected from the group consisting of porous carbon, metal oxide and combinations thereof.

15. A method for dispersing particles in perfluorinated polymer ionomer, the method comprising:

(a) combining noble metal catalyst particles and a perfluorinated ionomer precursor having an equivalent weight less than 700 g/mol in a mixture to coat the noble metal catalyst particles with the perfluorinated ionomer precursor;

(b) applying the noble metal catalyst particles that are coated with the perfluorinated ionomer precursor from step (a) onto a polymeric substrate; and (c) after step (b), treating the perfluorinated ionomer precursor with a cross-linking agent in basic solution comprising at least one tertiary amine base, thereby converting the perfluorinated ionomer precursor to a cross-linked perfluorinated proton-conducting ionomer having an equivalent weight ranging from 280 g/mol to 700 g/mol and being insoluble in water;

wherein the perfluorinated ionomer precursor comprises perfluorinated carbon-carbon linear backbone chains and perfluorinated pendent side chains extending off of the perfluorinated carbon-carbon linear backbone chains, and the perfluorinated pendent side chains terminate with a —$SO_2X$ group, where each X is independently selected from the group consisting of fluorine (F), chlorine (Cl) and amine ($NH_2$), wherein the combining includes dispersing the particles and coating the particles with a uniform, nano-thick coat of the perfluorinated ionomer precursor wherein the cross-linking agent has the formula $H_2NSO_2$—Rf—$SO_2NH_2$, wherein, Rf is branched or unbranched perfluoroalkyl or perfluoropolyether group comprising 1-10 carbon atoms and 0-4 oxygen atoms.

16. The method as recited in claim 15, wherein the polymeric substrate is perfluorinated sulfonic acid.

* * * * *